UNITED STATES PATENT OFFICE 2,525,072

CHEWING DENTIFRICES

Kenneth K. Kearby, Cranford, N. J., assignor to Standard Oil Development Company, a corporation of Delaware No Drawing. Application December 17, 1947, Serial No. 792,325

1 Claim. (Cl. 167—93)

The present invention relates to a chewing gum base containing dentifrices which have been rendered hydrophobic. In accordance with the present invention white inorganic adsorbent powders suitable as dentifrices are rendered hydrophobic and are incorporated in chewing gums.

Charcoal is at the present time quite commonly added to chewing gum for the purpose of sweetening breath and cleansing teeth. Use of charcoal, however, is subject to the disadvantage that the gum in which it is incorporated is necessarily black. As white substances are generally associated with cleanliness, and since most dentifrices are white, a black chewing gum of this nature is not as readily acceptable to consumers as a chewing gum having natural color. It is a particular object of this invention that agents be incorporated in gum having substantially the same effect as charcoal without making the gum black, and also having some beneficial effects not shown by charcoal.

In accordance with the present invention any chewing material may be used as the chewing gum base. For example, the chewing gum base may comprise chicle, which at the present time is one of the most commonly used bases for chewing gum. Other chewing gum bases are jelutong, gutta kari, gutta hangkang, and rubber latex. Conventionally various sweetening and flavoring agents as well as fillers or plasticizers are incorporated with the chewing gum base. It is contemplated that the white hydrophobic agents of the present invention may be incorporated with any of these compositions. Therefore, through the specification and the appended claim, use of the term "chewing gum base" will be understood to mean any chewing material of the general compositions indicated above incorporating the desired sweetening and flavoring agents.

Various inorganic oxides and carbonates are commonly used as dentifrices, for example, calcium carbonate, magnesium-carbonate, pumice, clay, and oxides and hydrated oxides of such elements as silicon, aluminum and titanium. In general, these compounds are hydrophilic in nature. Consequently, if these compounds are incorporated in chewing gum they are readily extracted from the chewing gum by the moisture of the mouth. In accordance with the present invention, however, these compounds are rendered hydrophobic in nature so to make them suitable for incorporation in chewing gum.

In addition to the inorganic compounds listed above preferred materials which may be employed are silica-alumina, silica-magnesia, and silica-alumina-magnesia mixtures and acid treated montmorillonite clays. These compounds have the beneficial properties of the inorganic oxides and carbonates aforementioned. However, the latter mentioned compounds being adsorbent in nature, have the advantage that they have greater adsorptivity of unpleasant odors. Consequently their use is to be preferred in chewing gum.

Preferred compositions of the adsorbent substances are given below:

Example I.—60–90% $SiO_2$+40–10% $Al_2O_3$
Example II.—55–80% $SiO_2$+45–20% $MgO$
Example III.—50–89% $SiO_2$+40–10% $Al_2O_3$+10–1% $MgO$
Example IV.—45–79% $SiO_2$+45–20% $MgO$+10–1% $Al_2O_3$ In accordance with my invention various methods of making the above identified white dentifrices hydrophobic may be used. One procedure which may be employed is to treat the oxide or carbonate desired with hydrofluoric acid. This is preferably accomplished in the vapor phase by exposing the powdered oxides or carbonates to a stream of air containing a low percentage of hydrofluoric acid vapors. The hydrofluoric acid reacts with the oxides or carbonates sufficiently to make them hydrophobic. Excess hydrofluoric acid is removed by washing the treated oxide or carbonates with a suitable solvent, such as water.

A preferred procedure for rendering the dentifrices hydrophobic is to treat them with an alkyl silicon halide. In general, any alkyl silicon halide may be employed. It is preferred, however, that the alkyl silicon halide used be vaporizable so that treatment of the dentifrices may be conveniently accomplished by exposing the powders to vapors of the alkyl silicon halide employed. Particular suitable silicons are methyl tri chlor silane and dimethyl dichlor silane. Other silanes which may be employed are, for example, trimethyl chlor silane, ethyl chlor silanes, propyl chlor silanes, methyl brom silanes, butyl brom silanes and the like. Mixed halide silanes may also be used. In general, my preferred compounds are alkyl chlor silanes, the alkyl group of which contains from 1 to 4 carbon atoms in the molecule. Either monomers or polymers of these compounds may be employed.

It is desirable to follow the treatment of the dentifrice with the alkyl silane by a hydrolysis treatment for the purpose of removing any unhydrolyzed halogens. This can be accomplished by steaming the treated dentifrices followed by drying at elevated temperatures. The resulting treated oxides or carbonates will contain bonded silicon atoms from which alkyl groups extend. In addition to rendering the oxide or carbonate hydrophobic better bonding to the common types of chewing substances will occur.

The fact that dentifrice type chewing gums can be prepared which will retain the dentifrice after prolonged chewing was demonstrated by determining the total solids in such gums after one hour of intensive chewing and comparing the results with those obtained for the same gums which did not include added dentifrices. Results on three different types of gum are shown below:

|  | Total Solids in Gum After One Hour Chewing | | |
|---|---|---|---|
|  | Chicle Base Gum | Rubber Latex Base Gum | Bubble Gum |
| Original Gum | 5.0 | 5.6 | 12.1 |
| Original Gum Plus Dentifrice [1] | 28.8 | 23.6 | 27.1 |

[1] Inorganic dentifrice (described below) added in amount of 10% to the original gum containing extractable sugar and other material The inorganic dentifrice powder used in the above gums was prepared as follows.

A 90% $SiO_2$–10% $Al_2O_3$ (dry basis) composition was prepared by impregnating washed silica hydrogel with aluminum sulphate solution and then treating the gel with ammonium hydroxide solution followed by thorough washing. The product was dried to about 10% water content, ground, and air floated to obtain very fine powder.

100 cc. of this powder was placed in a 1.25 inch by 36″ glass tube, and a stream of dry nitrogen (dry air is suitable) partly saturated with methyl chlor silanes was passed upward through the powder. (5 cc. of mixed methyl chlor silanes were used.) Following this treatment a stream of air saturated with water vapor at room temperature was passed through the powder for one-half hour. This product was dried at 300° F.

The above dentifrice powders were added in the amount of 10% to various gums by warming the gum to 80–90° C. and thoroughly mixing with the powder. The moisture content was adjusted to give a product having about the same consistency as the original chewing gum.

It was noted that the gums which contained the dentifrice caused a clean, pleasant condition in the mouth.

As described this invention comprises the addition to the chewing gum base of a white inorganic dentifrice which has been rendered hydrophobic by treatment with hydrofluoric acid or an alkyl silane. The dentifrices employed are inorganic oxides or carbonates and preferably are the oxides of silicon, aluminum, and magnesium for adsorbent properties. These dentifrices may be incorporated with the chewing gum in any desired proportion. It is preferred, however, that about 10–40% of the dentifrice be incorporated with the chewing gum. The resulting gum has a substantially natural color, is well bonded, will exert a cleaning action on the teeth and will adsorb unpleasant odors from the mouth.

Having now described my invention, I claim:

A chewing gum containing about 10% of a finely divided mixture of 90% silica and 10% alumina treated with methyl chlorsilanes.

KENNETH K. KEARBY.

REFERENCES CITED

The following references are of record in the file of this patent:

UNITED STATES PATENTS

| Number | Name | Date |
|---|---|---|
| 1,171,392 | Meier | Feb. 8, 1916 |
| 1,396,641 | King | Nov. 8, 1921 |
| 1,516,398 | McDowell | Nov. 18, 1924 |
| 1,851,475 | Zimmerman | Mar. 29, 1932 |
| 1,937,885 | Gitzen et al. | Dec. 5, 1933 |
| 1,943,467 | Bley | Jan. 16, 1934 |
| 1,943,856 | Cross | Jan. 16, 1934 |
| 2,010,910 | Atkins | Aug. 13, 1935 |
| 2,059,396 | Ripert | Nov. 3, 1936 |
| 2,078,498 | Klarmann | Apr. 27, 1937 |
| 2,130,034 | Schmidt | Sept. 13, 1938 |
| 2,218,172 | Kokatnur | Oct. 15, 1940 |
| 2,222,969 | Kistler | Nov. 26, 1940 |
| 2,424,853 | Safford | July 29, 1947 |

FOREIGN PATENTS

| Number | Country | Date |
|---|---|---|
| 3,034 | Great Britain | of 1914 |
| 294,299 | Great Britain | July 26, 1928 |
| 420,705 | France | Dec. 1, 1910 |

OTHER REFERENCES

Jay: J. Am. Dent. Assn., vol. 33, April 1, 1946, pages 489–495. (Copy in Scientific Library.)